Dec. 29, 1942.  E. GIANSETTO  2,306,621
WATER DISCHARGE VALVE MOUNT FOR WATER CLOSETS AND THE LIKE
Filed Feb. 15, 1941
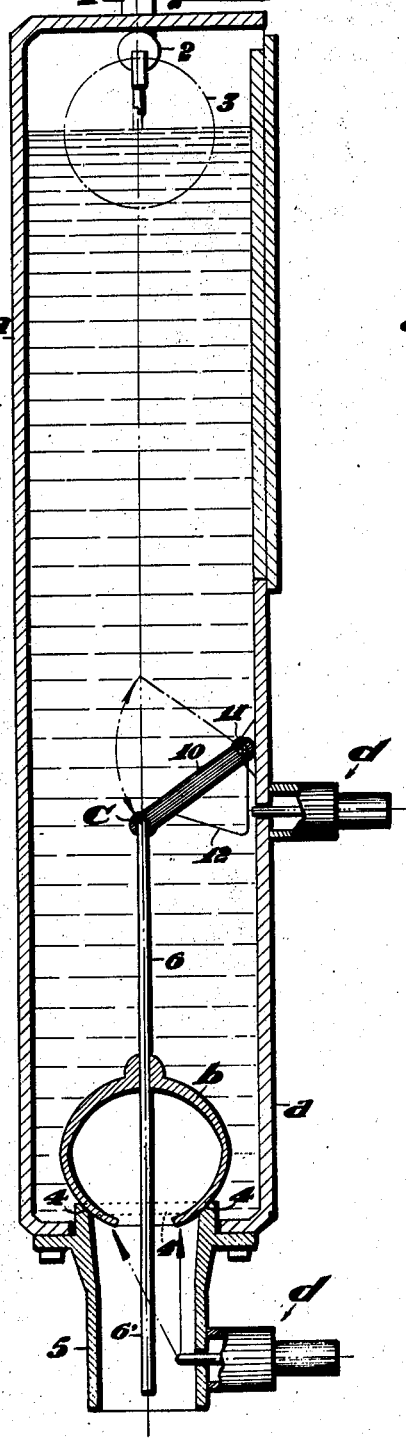
INVENTOR
E. Giansetto
BY
ATTORNEY Patented Dec. 29, 1942

2,306,621

UNITED STATES PATENT OFFICE 2,306,621

WATER DISCHARGE VALVE MOUNT FOR WATER CLOSETS AND THE LIKE

Eugenio Giansetto, Buenos Aires, Argentina

Application February 15, 1941, Serial No. 379,133

2 Claims. (Cl. 4—67)

This invention relates to a new water discharge valve mount, and particularly a mount for water discharge valves used in connection with flushing of water-closets, for the purpose of insuring the operation and obtaining a good closure due to the accurate adaptation in the valvular action thereof.

Discharge float valves are known, which have rigid members in their upper portion for the purpose of controlling the upward and downward stroke of the valves, in association with guide members, but inasmuch as several points of direction are used to direct the sliding, the centering of the float valve depends on the original mounting of the guide, and due to possible errors in measurement or subsequent alterations, the latter may assume a false position, with the consequent deviation of the float valve which is thus unable to perform an effective closure.

The new mount subject of the present invention overcomes this drawback, inasmuch as the mechanical guide is dispensed with, said float valve being controlled by its own weight through suspension or bearing from a fulcrum point serving as an apex for a possible angular variation, so that everything depends on the fulcrum point with respect to the closure seat of said float valve.

A further object of the invention is to provide a float valve which will be operated within the zone of discharge water, without the aid of guides and with a free action, so that although the valve is supported by flotation in the discharge liquid, upon the level of said liquid being lowered, the valve will be carried exactly towards the seat thereof, in order to produce an accurate seal.

A still further object of the invention is to provide for the ready mounting and removal of the float valve or obturator and its associated members, as a simple hooking or engaging action with a fulcrum bearing or adaptation will be sufficient for the valve to remain perfectly suspended and in condition to operate as a self-centering valve.

Another object of the invention is to provide means for providing angular freedom to the float valve, for a possible angular variation from the fulcrum point, with means for limiting said freedom in order to avoid the excessive deviation of the oscillating element.

A further object of the invention is to provide a pendular arrangement of the obturator or valve.

In order that the invention may be more clearly understood and readily carried into practice, same has been illustrated by way of example, a preferred embodiment, in the accompanying drawing, wherein:

Figure 1 is a side view of a reservoir in charged position, wherein the valve closing the discharge outlet carries a rod by means of which it is suspended from the end of a lever constituting the only point of support of said rod. In this embodiment, two control devices are shown; one on the suspension lever which is intermediary in the present instance, and the other on the discharge tube, where pushing means should be provided, as indicated by the arrows.

Figure 2 is a similar view of the same assembly of Fig. 1, but in disharge position, so as to show the manner in which the valve and its suspension rod, even though no guides are provided, is kept centered by its own weight in a plumb bob manner and aided by the central outlet causing the discharge cone as indicated by the arrows. In this figure, the line angles indicate the possible angular fluctuation of the virtual axis of the valve and its associated rod, which is capable of oscillating as a pendulum but in a sector limited by a lower extension of said rod, said limitation being provided by said extension contacting the walls of the discharge tube.

The same reference characters indicate like or corresponding parts or elements throughout the different drawings.

As may be seen in the drawing, $a$ is the reservoir into which water is fed through a pipe $l$ and controlled by a valve $2$ depending on the position of the float $3$. Said reservoir $a$ is provided with a discharge outlet having a seat $4$ from which the discharge pipe $5$ extends and leads to the water-closet.

A float valve $b$ is adapted on said seat $4$. This float valve $b$ is open at the bottom and joined to a rod $6$ the upper portion of which serves as a stem or suspension or centering member, as said rod, which is axially arranged relative to the virtual axis of the valve or obturator $b$, is connected to a single point of support or fulcrum $c$, which may be movable as shown in Figure 1. Said point of support $c$ allows the upward or downward movement of the obturator valve $b$, the stroke being sufficient for the valve to remain floating while the discharge is taking place, after being raised by thrust or traction effected through the operating or control devices $d$. Inasmuch as the fulcrum point $c$ is more or less centered with respect to the mouth $4'$, due to its own weight the obturator valve will follow the plumb direction, since a single upper point supports the rod $6$ and therefore, aided by the cone formed by the water during the discharge, said valve keeps its vertical position and coincides with the mouth $4'$, so that upon completion of the discharge, the valve will be fitted accurately against the seat 4 in order to form a tight seal.

Therefore, by means of the rod or member 6 the obturator valve is centered in a single point of connection and support, so that it may follow a plumb or straight direction, without any secondary point which might disturb such vertical direction, whereby the valve and its associated member or rod 6, making fulcrum or apex at c, is capable of angular oscillation with a pendular motion.

Naturally, such pendular action should be limited in order to avoid excessive deviations, and for this purpose the rod 6 extends downwardly as shown at 6', and said extension 6' enters the discharge pipe 5 and is sufficeintly long to remain between the walls of said pipe 5 even when said obturator valve b is in its uppermost position. Thus, the walls of said discharge pipe 5 constitute limiting points for the angular oscillation of the virtual axis of the valve b, as shown by the angular lines with apex at c in Figure 2.

As stated above, the point c may be movable so as to accompany the rod during the raising or lowering of the valve b.

In order to make the point c movable, it may be constituted by a displaceable element as shown in Figure 1, wherein said point c is located at the end of an arm 10 supported on shaft 11 and which may form a part of a lever or other suitable element in the case where it is intended to serve as an intermediary control element as illustrated in said figures, which show said arm 10 with a power extension 12 connected to the control device d.

The arm 10 with its point c is connected to the rod 6 by means of a hook, pivot or linkage, so that the rod and valve assembly will depend from said point with a possible angular oscillation as graphically shown in Figure 2. Upon said float valve being pushed or drawn through the action of the device d, it moves upwardly and opens the discharge outlet, and therefore the arm 10 also moves upwardly with the valve, as shown in Figure 2.

It will be understood that in carrying the invention into practice, several modifications in construction and detail may be made without departing from the scope of the invention as clearly set forth in the appended claims.

What I claim is:

1. A water discharge valve for flushing water-closets comprising a float valve, a seat with which said float valve cooperates, a pendular suspension rod fixed to said float valve and extending from the top thereof to the bottom, a pivoted lever connected pivotally to the upper portion of said rod so that said lever and said float valve will remain coupled in such a manner that said lever will be directly responsive to the vertical movement of said float valve and vice-versa, said lever being located perpendicularly to the front plane of the water-closet reservoir and manual means for operating said lever.

2. A water discharge valve for flushing water-closets comprising a float valve, a seat with which said float valve cooperates, a pendular oscillating suspension rod fixed to said float valve, a lever to which said rod is pivotally connected, the end of said lever serving as a centering element and a suspension point for controlling the line of upward and downward movement of said float valve, the connection between the rod and the end of said lever being formed by articulation so that said float valve will respond to the action of said lever and vice versa.

EUGENIO GIANSETTO.